United States Patent [19]

Vining

[11] Patent Number: 5,301,631
[45] Date of Patent: Apr. 12, 1994

[54] BALLOON EMERGENCY LOCATING DEVICE

[76] Inventor: John K. Vining, 5075 S. Evanston St., Aurora, Colo. 80015

[21] Appl. No.: 50,867

[22] Filed: Apr. 21, 1993

[51] Int. Cl.$^5$ .............................................. B64B 1/50
[52] U.S. Cl. .............................. 116/210; 116/DIG. 9; 141/19; 141/329; 222/5
[58] Field of Search .......... 116/210, DIG. 8, DIG. 9; 244/33; 441/92, 93; 141/17, 329; 222/5

[56] References Cited

U.S. PATENT DOCUMENTS

| | | | |
|---|---|---|---|
| 3,017,907 | 1/1962 | Quail et al. | 285/306 |
| 3,216,466 | 11/1965 | Simko | 141/226 |
| 3,381,655 | 5/1968 | Rozzelle | 116/210 |
| 3,834,433 | 9/1974 | Thompson | 141/19 |
| 3,924,654 | 12/1975 | Buller et al. | 137/322 |
| 3,941,079 | 3/1976 | McNeill | 116/210 |
| 4,114,561 | 9/1978 | Asaro | 116/124 B |
| 4,185,582 | 1/1980 | Bryant | 116/210 |
| 4,546,956 | 10/1985 | Moberg | 285/316 X |
| 4,586,456 | 5/1986 | Forward | 116/210 |
| 4,836,128 | 6/1989 | Walker | 116/210 |
| 4,917,041 | 4/1990 | Weiswurm et al. | 116/210 |
| 4,944,242 | 7/1990 | Russell | 116/210 |
| 5,020,467 | 6/1991 | Van Patten et al. | 116/210 |

FOREIGN PATENT DOCUMENTS 0732033  4/1966  Canada ................................ 222/5

Primary Examiner—William A. Cuchlinski, Jr.
Assistant Examiner—W. Morris Worth
Attorney, Agent, or Firm—Dorr, Carson, Sloan & Peterson

[57] ABSTRACT

An emergency locating device allows an injured person to inflate and deploy a balloon using only one hand. The device has a cylindrical housing holding a cartridge pressurized with a quantity of a lighter-than-air gas, a quick-release fitting for removably attaching the balloon to the upper end of the housing, and an actuator extending from the lower end of the housing for causing a pin to puncture the cartridge when the actuator is depressed to allow gas to flow from the cartridge through the fitting to inflate the balloon. The fitting can be manually separated into a lower segment that remains attached to the housing, and an upper segment attached to the balloon that includes a one-way valve to prevent gas from escaping. The inflated balloon is tethered by a line to the housing. The upper portion of the housing can be used as a reel or spool to store the tether line when not in use.

12 Claims, 5 Drawing Sheets

BALLOON EMERGENCY LOCATING DEVICE

BACKGROUND OF THE INVENTION

1. Field of the Invention.

The present invention relates generally to the field of inflatable balloons used for the purposes of rescue or signalling. More specifically, the present invention discloses an inflatable balloon that can be deployed by an injured person using only one hand.

2. Statement of the Problem.

Many types of signal or rescue balloons have been developed in the past. These all have the same basic concept of inflating a balloon with a lighter-than-air gas (e.g. helium) from a pressurized cylinder or cartridge and tethering the inflated balloon to a base unit or handle of some type. It has been recognized that these devices can assist in finding lost or injured aviators, boaters, skiers, hikers, and the like. Examples of these devices include the following:

| Inventor | Patent No. | Issue Date |
| --- | --- | --- |
| Rozzelle | 3,381,655 | May 7, 1968 |
| McNeill | 3,941,079 | March 2, 1976 |
| Asaro | 4,114,561 | Sep. 19, 1978 |
| Bryant | 4,185,582 | Jan. 29, 1980 |
| Forward | 4,586,456 | May 6, 1986 |
| Walker | 4,836,128 | June 6, 1989 |
| Weiswurm, et al. | 4,917,041 | Apr. 17, 1990 |
| Russell | 4,944,242 | July 31, 1990 |
| Van Patten, et al. | 5,020,467 | June 4, 1991 |

Rozzelle discloses a rescue balloon assembly in which gas is released from a gas tank to inflate the balloon by tightening two parts of a valve assembly. A frangible connector in the valve assembly permits the inflated balloon to be severed from the tank. The balloon is permitted to rise, but remains tethered by an anchor line to the tank.

McNeill discloses an emergency locating device that includes an inflatable balloon, a high-pressure cylinder containing a lighter-than-air gas, and a valve to release gas from the cylinder into the balloon. A rotatable cylindrical reel holds a length of line that can be spooled out to tether the inflated balloon. Radar reflective means, such a metal foil 65, are secured to the tether line.

Asaro discloses an avalanche rescue marker system consisting of an openable pack assembly carried on the upper back of the user, a trigger inflation assembly carried on the upper front of the user, and a gas tube extending therebetween. The trigger inflation assembly includes a gas cylinder. When a lever on the trigger inflation assembly is pulled by the user, gas from the cylinder flows through the tube and inflates a marker balloon stored in the pack assembly. The balloon then automatically escapes, pulling a tether line upward along with the balloon to mark the location of the user.

Bryant discloses an actuator mechanism for inflating and releasing a distress signal balloon.

Forward discloses a balloon distress marker having a compartment for containing small articles. The rescue kit includes a gas cylinder for inflating the balloon and a reel for paying out a line to tether the balloon. FIGS. 6 and 7 show a series of reflective plates 50, 51, and 52 attached to the tether line 13.

Walker discloses a position indicating balloon. The system includes an actuator 29 that can be rotated to release gas from a capsule 11 to inflate the balloon 13. A release pin 46 is withdrawn to release the inflated balloon. The balloon is tethered by a line.

Weiswurm, et al., disclose an inflatable balloon for marking a position. A gas cartridge is inserted into an opening in one end of a handle connected by a tether line to the balloon. The handle includes a spool around which the tether line is wound, a nipple for receiving the throat of the balloon, and a pin valve for puncturing the inserted cartridge and thereby releasing gas to inflate the balloon.

Russell discloses a rescue balloon device that includes a balloon, a gas cartridge, and a line tethering the balloon to the device housing. The tether line is wound on a friction spool to prevent the line from freely paying out and snarling.

Van Patten, et al., disclose a balloon signalling system that includes a gas cartridge for inflating the balloon and a reel for paying out a line to tether the balloon. The cartridge 36 remains attached to the balloon 58 after it has been deployed, as shown in FIG. 2.

All of these prior art devices have shortcomings in terms of ease of deployment for an injured user. In particular, the prior art devices generally require a fair amount of manual dexterity and/or use of both hands to inflate and deploy the balloon.

3. Solution to the Problem.

None of the prior art references uncovered in the search show an emergency locating device having a puncture pin mechanism that allows the balloon to be inflated with use of only one hand (e.g. by an injured pilot). The fitting at the base of the balloon can also be disconnected from the housing by use of only one hand to deploy the balloon. In addition, the balloon in the present invention can be made of metallized mylar to enhance its radar visibility.

SUMMARY OF THE INVENTION

This invention provides an emergency locating device that allows an injured person to inflate and deploy a balloon using only one hand. The device has a cylindrical housing holding a cartridge pressurized with a quantity of a lighter-than-air gas, a quick-release fitting for removably attaching the balloon to the upper end of the housing, and an actuator extending from the lower end of the housing for causing a pin to puncture the cartridge when the actuator is depressed to allow gas to flow from the cartridge through the fitting to inflate the balloon. The fitting can be manually separated into a lower segment that remains attached to the housing, and an upper segment attached to the balloon that includes a one-way valve to prevent gas from escaping. The inflated balloon is tethered by a line to the housing. The upper portion of the housing can be used as a reel or spool to store the tether line when not in use.

A primary object of the present invention is to provide an inflatable balloon that can be easily inflated and deployed by an injured person.

Another object of the present invention is to provide a emergency locator device for deploying an inflatable balloon that is highly visible to radar detection.

Yet another object of the present invention is to provide an emergency locator device that is compact, rugged, reliable, and relatively inexpensive to manufacture.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
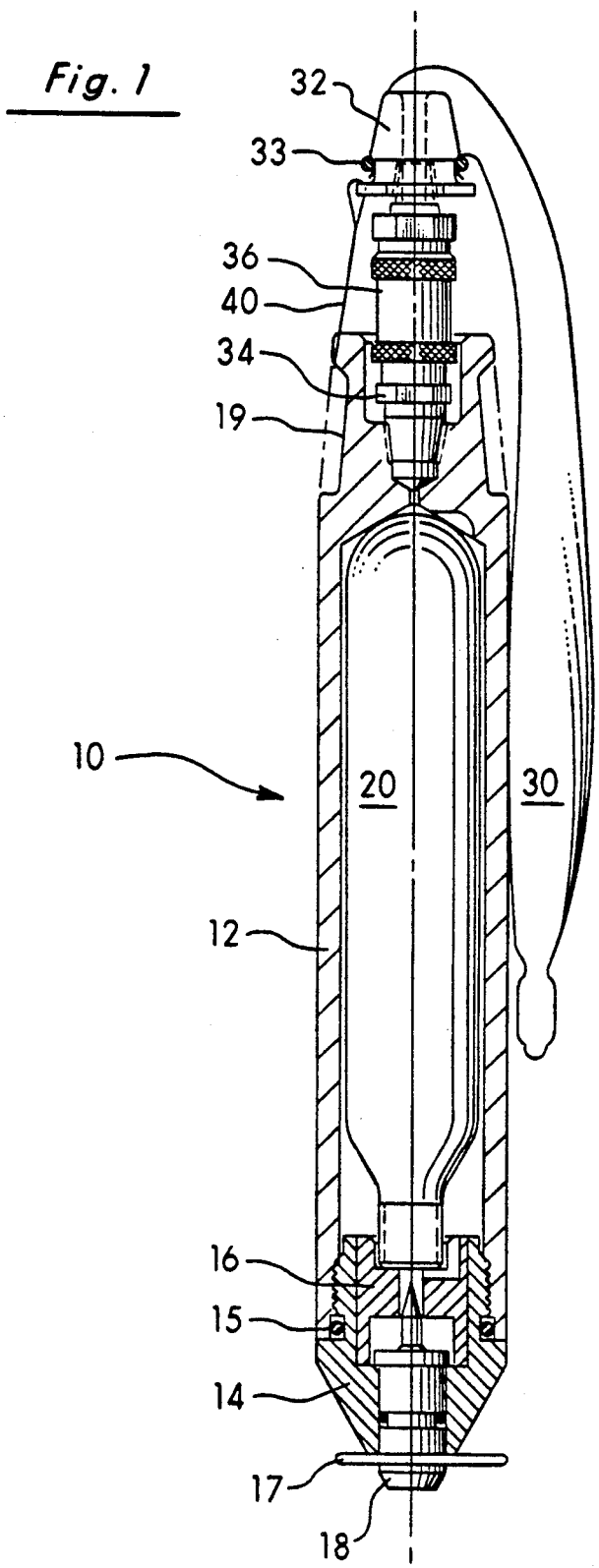
FIG. 1 is a cross-sectional view of the assembled device.

Turning to FIG. 1, an overall cross-sectional view is provided of the entire device 10 prior to deployment. The device 10 generally includes an inflatable balloon 30 attached to a cylindrical housing 12 containing the remaining components of the device. The balloon 30 can be made of rubber, latex, plastic, or metal foil. In the preferred embodiment, the balloon is made of metallized mylar to enhance its radar visibility. The size and shape of the balloon are also largely arbitrary. The volume of the balloon should be within a range sufficient to be adequately inflated, but not over-inflated, by the amount of gas contained within a standard pressurized gas cartridge. In addition, the lifting power of the inflated balloon should be sufficient to carry the balloon, tether line, and any attached color streamers to a substantial altitude.

Figure 2:
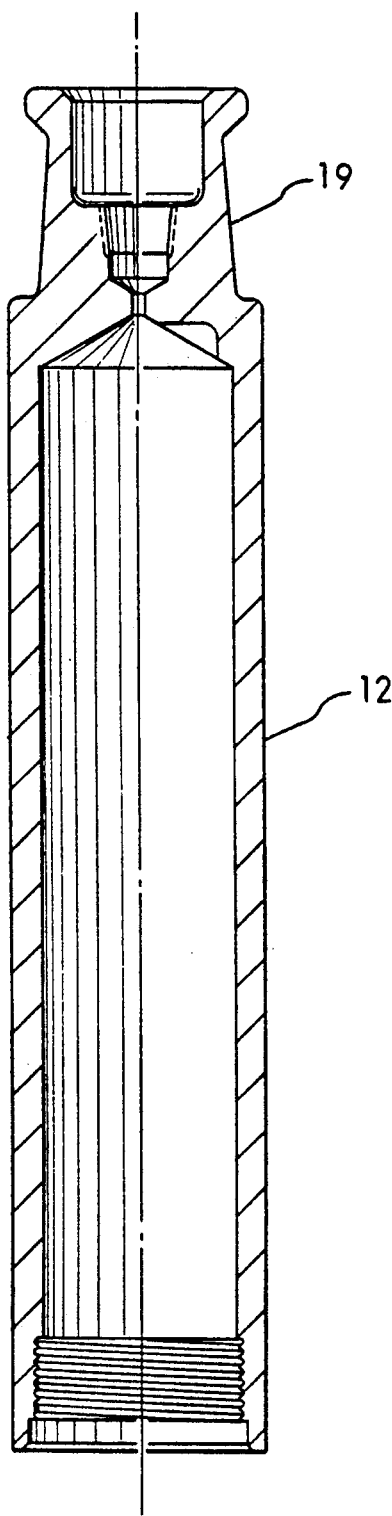
FIG. 2 is a cross-sectional view of the housing used to contain the gas cartridge.

The cylindrical housing 12 serves as the means for initially inflating the balloon 30, and then as a hand-held base to tether the balloon following its deployment. The housing 12 has an interior cavity sized to hold a removable cartridge 20 pressurized with a lighter-than-air gas, such as helium. FIG. 2 shows a cross-sectional view of the housing 12 and its interior cavity.

Figure 4:
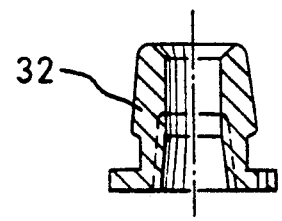
FIG. 4 is a cross-sectional view of the adapter 32 used to attach the balloon to the remainder of the device.
Figure 7:
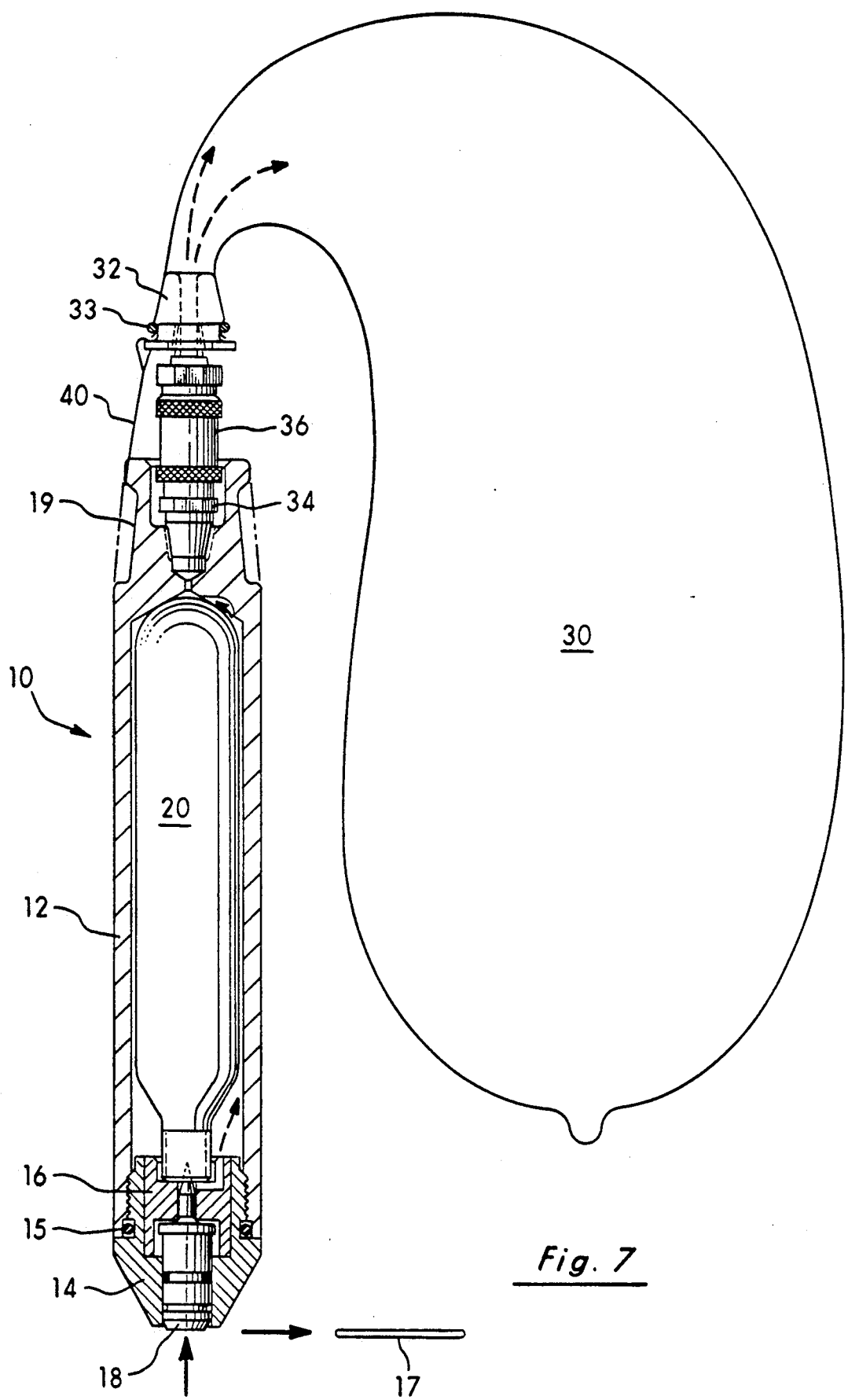
FIG. 7 is a cross-sectional view of the assembled device during inflation of the balloon 30.

An adapter 32 is inserted into the opening at the base of the balloon 30 and is used to attach the balloon 30 to the remainder of the device 10. The adapter 32 includes a central passageway that allows gas to flow through the adapter and into the balloon. FIG. 4 provides a cross-sectional view of this adapter 32. A clip 33 is fastened over the neck of the balloon 30 to secure the balloon to the adapter 32 as shown in FIGS. 1, 7, and 8B.

Figures 8A, 8B:
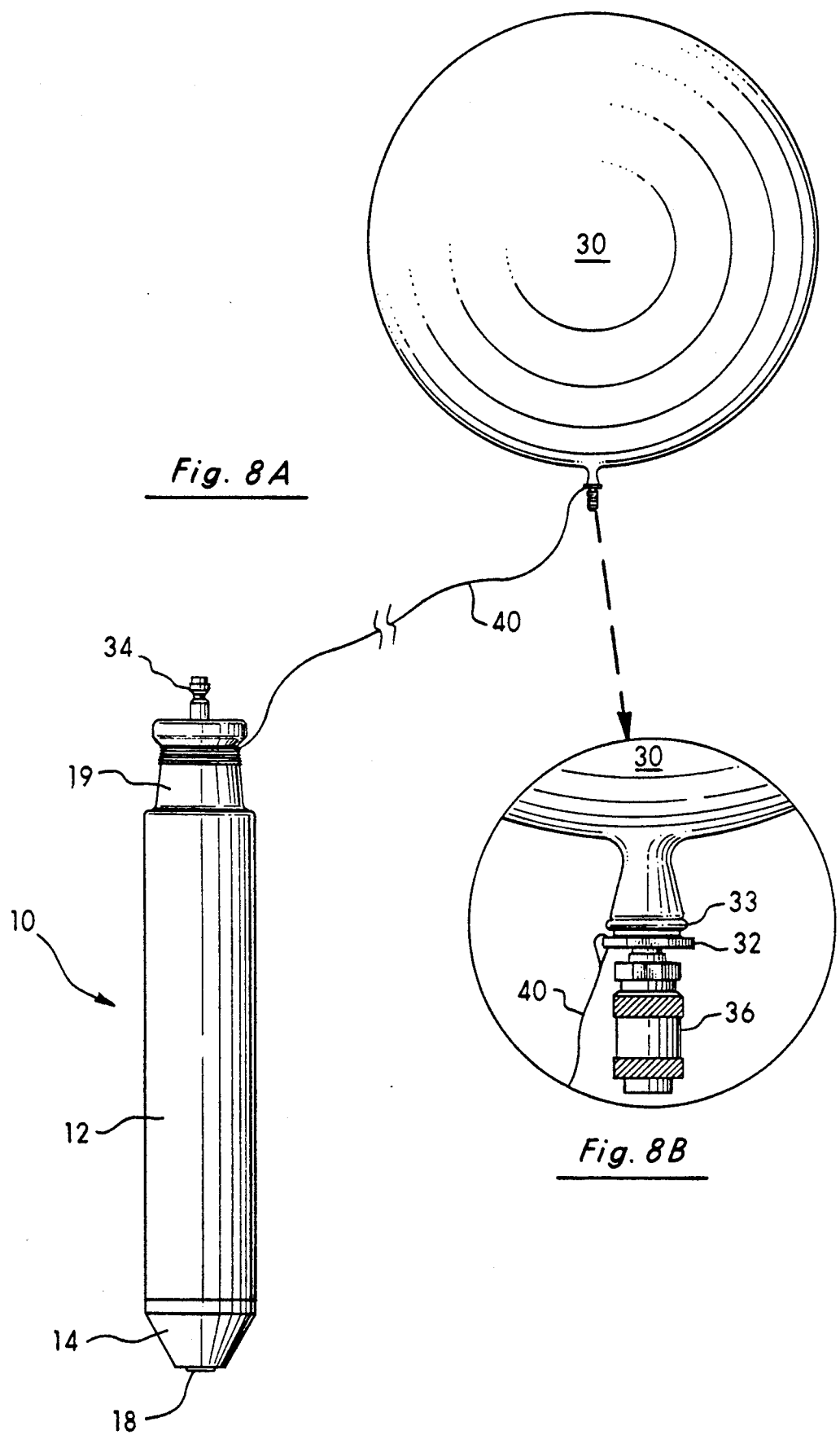
FIG. 8A is a side view of the device after the balloon has been inflated and detached from the housing.
FIG. 8B is a detail side view of the upper segment of the quick-release fitting attached to the base of the balloon.

Prior to deployment, the balloon 30 is connected to the upper end of the housing 12 by means of a quick-release fitting having an upper segment 36 that can be separated from its lower segment 34, as shown in FIG. 8B. The upper segment 36 of the fitting is attached to the bottom of the adapter 32 and has a central passageway that extends downward from the adapter 32 to allow inflation of the balloon. The upper segment 36 of the fitting also includes a one-way valve that prevents gas from escaping after the balloon has been inflated. A spring-loaded ball valve can be employed for this purpose. The lower segment 34 of the fitting is secured to the upper end of the housing 12, and has a central passageway that connects with the passageway through the upper segment of the fitting. Prior to separation of the balloon 30 from the housing 12, the passageways through the fitting 34, 36 and adapter 32 allow gas to flow from the cartridge 20 within the housing 12 through the fitting and adapter into the balloon. An outer cylindrical sleeve joins both the upper segment and the lower segment of the fitting together under normal conditions prior to deployment of the balloon, but allows the upper and lower segments 36 and 34 to be quickly disconnected for one another simply by translating or sliding the sleeve downward a small distance relative to the lower segment 34. This sleeve can easily by translated using only one hand, thereby disconnecting the balloon 30, adapter 32, and upper segment 36 from the lower segment 34 and the housing 12. After separation of the two segments of the fitting, the one-way valve in the upper segment prevents gas from escaping from the balloon. In the preferred embodiment, the fitting is a Series 1A quick-release fitting available from Duff-Norton, of Charlotte, N.C.

Figure 3:
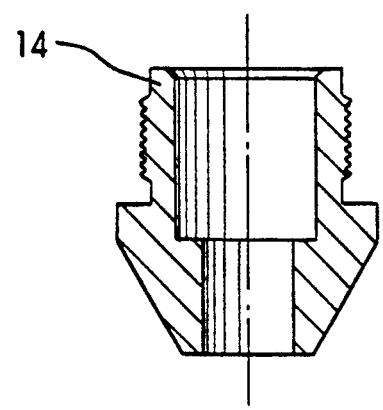
FIG. 3 is a cross-sectional view of the bottom end cap 14 for the housing.

A bottom end cap 14 threads onto the lower end of the housing 12. FIG. 3 shows a cross-sectional view of the bottom end cap 14. An O-ring 15 provides a gas-tight seal between the bottom end cap 14 and the cylindrical housing 12 as shown in FIG. 1.

Figure 5:
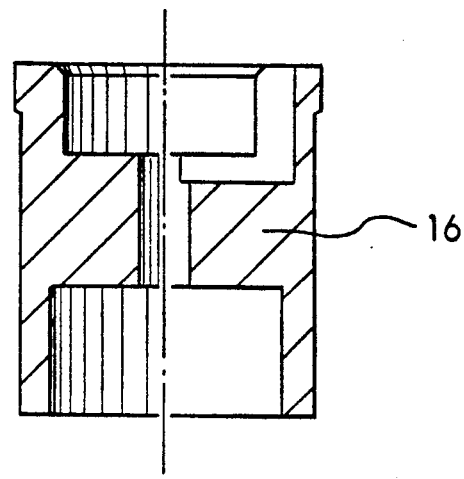
FIG. 5 is a cross-sectional view of insert 16 used to guide the actuator pin 18.
Figure 6:
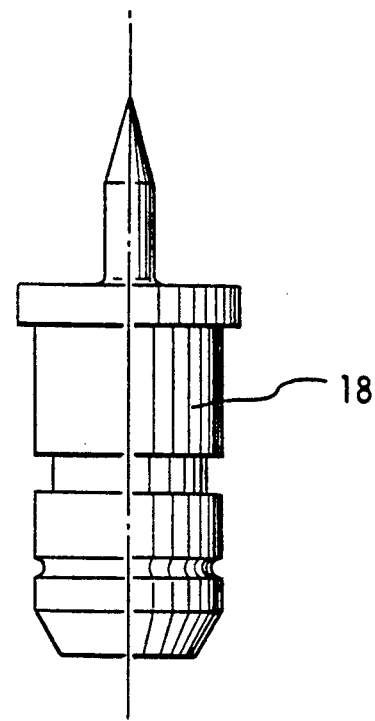
FIG. 6 is a side view of actuator pin 18.

An actuator pin 18 extends through the lower end of the bottom end cap 14. The upper end of the actuator pin is pointed, and is used to puncture the gas cartridge 20. FIG. 6 is a side view of the actuator pin 18. An insert 16, shown in cross-sectional view in FIG. 5, positioned within the housing 12 and above the bottom end cap 14 has a vertical bore that guides the range of motion of the actuator pin 18 relative to the end of the gas cartridge 20. This range of motion of the actuator pin 18 is best demonstrated by comparing positions of the actuator pin relative to the bottom end cap 14 and the gas cartridge 20 in FIGS. 1 and 7. In particular, in FIG. 1 the bottom of the actuator pin 18 extends well below the bottom end cap 14 and the upper end of the actuator pin is positioned below the gas cartridge 20. In FIG. 7, the actuator 18 has been pushed upward so that its lower end is essentially flush with the bottom end cap 14, and its upper end has punctured the gas cartridge 20 to release the gas contained therein.

A safety pin 17 prevents the actuator pin 18 from being accidently depressed to inadvertently puncture the gas cartridge. In the preferred embodiment, the safety pin 17 clips over a recessed groove extending around the circumference of the actuator pin below the bottom end cap 14, as shown in FIG. 1. Alternatively, the safety pin 17 can be inserted through a hole in the exposed lower end of the actuator pin 18. The safety pin 17 is removed when the balloon is to be deployed, as shown in FIG. 7.

In the preferred embodiment, the device includes a vertically-oriented spool 19 for storing a length of line 40 used to tether the balloon 30 to the housing 12. The spool 19 can be a recessed cylindrical or tapered conical surface formed as an integral part of the surface of the upper portion of the housing 12 as shown in FIGS. 1 and 8A. Color-coded streamer can be suspended from the balloon or the tether line to advise rescuers of the condition or the needs of the party deploying the balloon 30.

FIG. 1 shows the device in the state in which it would normally be removed from storage in a protective container or a cloth sleeve. Alternatively, the device is designed and dimensioned to fit comfortably in the lower leg pocket of a conventional flight suit worn by airmen. The safety pin 17 is then manually withdrawn from the actuator pin 18 to allow the actuator pin 18 to be depressed as shown in FIG. 7. This can be accomplished using only one hand, for example, by gripping the housing 12 and striking the base of the actuator pin 18 extending from the lower end of the housing against a rock or other hard surface. This causes the actuator pin 18 to translate upward relative to the housing 12 and its bottom end cap 14 into the position shown in the cross-sectional view provided in FIG. 7. The pointed upper end of the actuator pin 18 punctures the gas cartridge 20 releasing the pressurized gas contained therein. The gas flows through the port in the insert 16, upward along the gap between the gas cartridge and the interior surface of the cavity in the housing 12, through the fitting 34, 36 and the adapter 32, and into the balloon 30. The path of the gas flow is shown by the dashed arrows in FIG. 7. The gas pressure quickly equalizes as gas flows from the cartridge 20 and inflates the balloon 30.

After the balloon 30 has been fully inflated, the user disconnects the upper segment 36 of the quick-release fitting from its lower segment by sliding the sleeve downward by a small distance. FIG. 8A is a side view of the device after the balloon 30 has been inflated and detached from the housing 12. The balloon remains tethered to the base housing 12 by a length of line 40 paid out from the spool 19.

The above disclosure sets forth a number of embodiments of the present invention. Other arrangements or embodiments, not precisely set forth, could be practiced under the teachings of the present invention and as set forth in the following claims.

I claim:
1. An emergency locating device comprising:
   a cartridge pressurized with a quantity of a lighter-than-air gas;
   a housing having an interior cavity for containing said cartridge and a lower end;
   an inflatable balloon having an opening;
   a fitting for removably attaching said balloon to said housing having:
      (a) an upper segment secured to said opening of said balloon having a passageway with a one-way valve allowing gas to flow into said balloon, but preventing gas from escaping from said balloon;
      (b) a lower segment secured to said housing having a passageway in communication with said housing cavity allowing gas to flow from said cartridge within said housing through said upper segment into said balloon; and
      (c) connector means for removably attaching said upper segment to said lower segment;
   a line for tethering said balloon to said housing;
   an actuator pin with a pointed first end adjacent said cartridge and a second end slidably extending through said housing, said first end of said actuator pin puncturing said cartridge to release said gas therein when said second end of said actuator pin is depressed.

2. The emergency locating device of claim 1, wherein said balloon is comprised of metallized mylar.

3. The emergency locating device of claim 1, wherein said housing further comprises a vertically-oriented spool for storing said line.

4. The emergency locating device of claim 1 wherein said connector means further comprise a translatable sleeve for disconnecting said upper segment from said lower segment of said fitting.

5. The emergency locating device of claim 1 wherein said gas comprises helium.

6. An emergency locating device comprising:
   a cartridge pressurized with a quantity of a lighter-than-air gas;
   a housing having an interior cavity for containing said cartridge and a lower end;
   an inflatable balloon having an opening;
   a fitting for removable attaching said balloon to said housing having:
      (a) an upper segment secured to said opening of said balloon having a passageway with a one-way valve allowing gas to flow into said balloon, but preventing gas from escaping from said balloon;
      (b) a lower segment secured to said housing having a passageway in communication with said housing cavity allowing gas to flow from said cartridge within said housing through said upper segment into said balloon; and
      (c) a translatable sleeve for disconnecting said upper segment from said lower segment of said fitting;
   a line for tethering said balloon to said housing; and
   an actuator pin with a pointed upper end adjacent said cartridge and a lower end slidably extending vertically downward through said lower end of said housing, said upper end of said actuator pin puncturing said cartridge to release said gas therein when said lower end of said actuator pin is depressed.

7. The emergency locating device of claim 6, further comprising a removable safety pin to prevent accidental depression of said actuator pin until said safety pin is removed.

8. The emergency locating device of claim 6, wherein said balloon is comprised of metallized mylar.

9. The emergency locating device of claim 6, wherein said housing further comprises a vertically-oriented spool for storing said line.

10. An emergency locating device comprising:
   a cartridge pressurized with a quantity of a lighter-than-air gas;
   a substantially cylindrical housing having an interior cavity for containing said cartridge and a lower end, with a portion of said housing forming a spool to store a quantity of line;
   an inflatable balloon made of metallized mylar and having an opening;
   a fitting for removably attaching said balloon to said housing having:
      (a) an upper segment secured to said opening of said balloon having a passageway with a one-way valve allowing gas to flow into said balloon, but preventing gas from escaping from said balloon;
      (b) a lower segment secured to said housing having a passageway in communication with said housing cavity allowing gas to flow from said cartridge within said housing through said upper segment into said balloon; and (c) a translatable sleeve for disconnecting said upper segment from said lower segment of said fitting;

a line having an upper end for tethering said balloon with the remainder of said line being wound around said spool portion of said housing; and an actuator pin with a pointed upper end adjacent said cartridge and a lower end slidably extending vertically downward through said lower end of said housing, said upper end of said actuator pin puncturing said cartridge to release said gas therein when said lower end of said actuator pin is depressed.

11. The emergency locating device of claim 10, further comprising a removable safety pin to prevent accidental depression of said actuator pin until said safety pin is removed.

12. The emergency locating device of claim 10 wherein said gas comprises helium.

* * * * *